United States Patent [19]

Lennemann et al.

[11] Patent Number: 4,609,818
[45] Date of Patent: Sep. 2, 1986

[54] OPTO-ELECTRONIC SCANNING APPARATUS WITH ROTARY PLATE SCANNING ELEMENT

[75] Inventors: Eckart Lennemann, Herrenberg; Werner Ruppert, Schönaich, both of Fed. Rep. of Germany

[73] Assignee: International Business Machines Corporation, Armonk, N.Y.

[21] Appl. No.: 564,985

[22] Filed: Dec. 23, 1983

[30] Foreign Application Priority Data

Dec. 24, 1982 [EP] European Pat. Off. ...... 821111984.9

[51] Int. Cl.⁴ .............................................. H01J 3/14
[52] U.S. Cl. ...................... 250/234; 358/293
[58] Field of Search ........... 250/560, 234, 235, 236; 358/293, 285, 199; 33/1 M; 235/464

[56] References Cited

U.S. PATENT DOCUMENTS

| | | | |
|---|---|---|---|
| 2,396,705 | 3/1946 | Khalil | 358/293 |
| 3,365,755 | 1/1968 | Vastano et al. | 24/49 |
| 3,526,708 | 9/1970 | Leatherman | 178/6.6 |
| 3,867,569 | 2/1975 | Watson | 358/293 |
| 3,886,371 | 5/1975 | Lloyd | 358/285 |
| 4,122,352 | 10/1978 | Crean et al. | 250/566 |
| 4,128,755 | 12/1978 | Fairley et al. | 235/92 T |
| 4,150,873 | 4/1979 | Dali | 358/285 |
| 4,233,740 | 11/1980 | Bunn et al. | 33/1 M |
| 4,245,259 | 1/1981 | Pick | 358/293 |
| 4,319,283 | 3/1982 | Ozawa et al. | 358/293 |

Primary Examiner—David C. Nelms
Assistant Examiner—S. Allen
Attorney, Agent, or Firm—Earl C. Hancock

[57] ABSTRACT

The invention relates to an opto-electronic scanning apparatus with a document support on a common frame, and a scanning head scanning a document in two different directions, which is characterized in that on the frame a first carrier (4; 27) is mounted that can be driven by a first driving means (5; 18) in the first direction, that on the first carrier (4; 27) a second carrier (12) is mounted which carries a scanning head (16, 17) operating in the second scanning direction only, that the scanning head (16, 17) on the second carrier (12) is linearly movable in the second scanning direction only, and that for each direction of movement a separate driving means is provided.

5 Claims, 4 Drawing Figures

OPTO-ELECTRONIC SCANNING APPARATUS WITH ROTARY PLATE SCANNING ELEMENT

The invention relates to an opto-electronic scanning apparatus with a document support provided on a common frame, and with a scanning head scanning a document in two different directions.

Scanning devices of this type have been known since a long time, and in a great number.

From DAS No. 15 62 173, to give an example, a scanning device is known where an arrangement of photoelectric transducers arranged in several rows is shiftable in one plane in parallel to the document plane in two different directions, the transducers arranged in several parallel rows being staggered relative to each other in scanning direction.

The photoelectronic scanning of a document placed on a drum by an opto-electronic scanning head that can be displaced transversally to the rotating drum is known in its basic features from DE-AS No. 27 01 001.

A facsimile scanner with the row-by-row opto-electronic scanning of a document is known from DE-OS No. 25 08 115. The light reflected from the original is scanned row-by-row by means of a scanning head and stored in a row storage equipped with charge-coupled memory cells.

Devices of this kind usually have two, sometimes even three interdependent or/and inter-coupled degrees of freedom. A rotating drum, for instance, is to have clearance in its axis bearings. Besides, a drum is never precisely round but always has a slight eccentricity. A scanning arrangement movable along a row has clearance, too, and thus introduces a further degree of freedom, thereby rendering the scanning somewhat inaccurate.

SUMMARY OF THE INVENTION

It is the object of the present invention to construct a high precision, high resolution scanning apparatus in such a manner that the interdependent degrees of freedom of the scanning movement can be decoupled and rendered independent of each other. A particularly advantageous embodiment of the invention comprises only one degree of freedom which however is of almost no influence on the precision of the scanning. According to the invention, this object is achieved in that on the frame a first carrier is provided that can be driven by a first driving system in a first direction, and that on the first carrier a second carrier is mounted carrying a scanning head effective in the second scanning direction only, that furthermore the scanning head on the second carrier is linearly movable only in the second scanning direction, and that for each direction of movement a separate drive is provided.

The arrangement is advantageously designed in such a manner that the first carrier is linearly movable in the first scanning direction.

It is of particular advantage when the first carrier is rotatable relative to the document support.

The invention will now be described in detail by way of examples with reference to the attached drawings.

DETAILED DESCRIPTION

Figure 1:
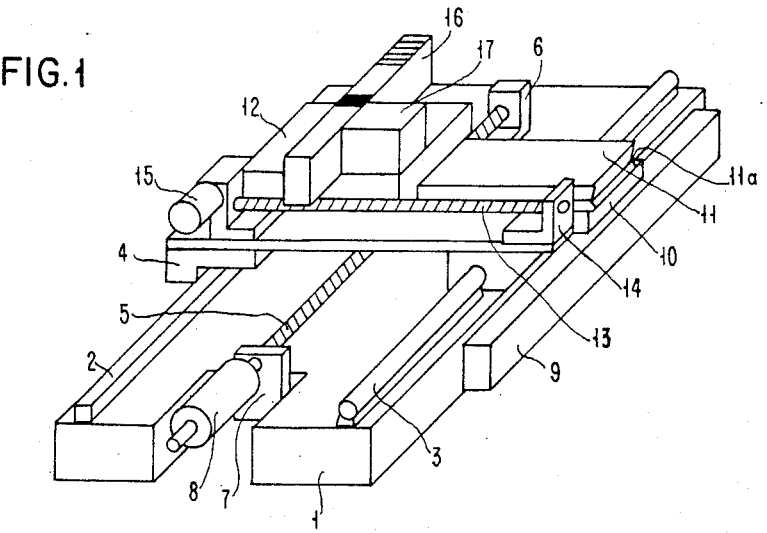
FIG. 1 strictly schematically an opto-electronic scanning apparatus in accordance with a first embodiment of the invention, FIG. 2 the principle of another embodiment of the invention.

FIG. 1 shows a table of high rigidity as it is required for a scanning apparatus of high precision and high resolution. This table can be mounted e.g. in a casing in such a manner that the entire scanning apparatus can cover the document to be scanned.

On table 1, two sliding rails 2 and 3 are mounted. In the present embodiment, sliding rail 2 is rectangular or square whereas sliding rail 3 is round. Both sliding rails are fixedly connected to table 1, slide rail 2 and table 1 could also be a single part structure. These sliding rails are made with high precision and should if possible even be mirror-polished.

A first carrier 4 is movable on these sliding rails. For that purpose, a threaded spindle 5 is supported in end bearings 6 and 7 and driven by a driving motor 8 for the X-direction. A threaded bushing at the first carrier 4 is provided to receive the threaded spindle so that by driving motor 8 the spindle is rotated, and the first carrier may be moved in both directions. The bearings with which carrier 4 moves on sliding rails 2 and 3 are also made with high precision. On the one hand, the friction between carrier 4 and sliding rails 2 and 3 should be as low as possible, but on the other the clearance in the bearings should be at a minimum. On one side of table 1, there is a scale 9 on a glass rod or similar instrument which can be illuminated. An optical measuring scanner on carrier 4 emits position signals to a connected control circuit not shown here. Carrier 4 carries a sliding rail 11 which is also of high precision and rigidity. In the first embodiment of the invention, a second carrier 12 is movable on this sliding rail, the carrier sliding e.g. in grooves 11a on both sides of sliding rail 11. For the drive, a driving spindle 13 is supported in end bearings 14 and drivable by a driving motor 15, e.g. a stepping motor, in Y-direction. Here, too, the support of the second carrier is of high precision and minimum friction, but also with minimum clearance. The second carrier carries an optical module 16 and a camera control 17.

For this new design it is of decisive importance that the two drives are entirely independent of each other, i.e. that the degrees of freedom of the one drive are decoupled from the degrees of freedom of the other drive.

However, a particularly advantageous arrangement is obtained when on carrier 4, instead of an optical system movable on a second carrier 12, an optical module extending over the entire width of the carrier and consisting of a scanning line extending over the entire width and consisting of photodiodes, phototransistors, charge-coupled elements or other photosensitive cells, is used in connection with the associated light sources, optics, and camera control. Scanning is then effected row by row via a correspondingly structured electronic control which can be of a known design and does not have to be specified here.

Figure 2:
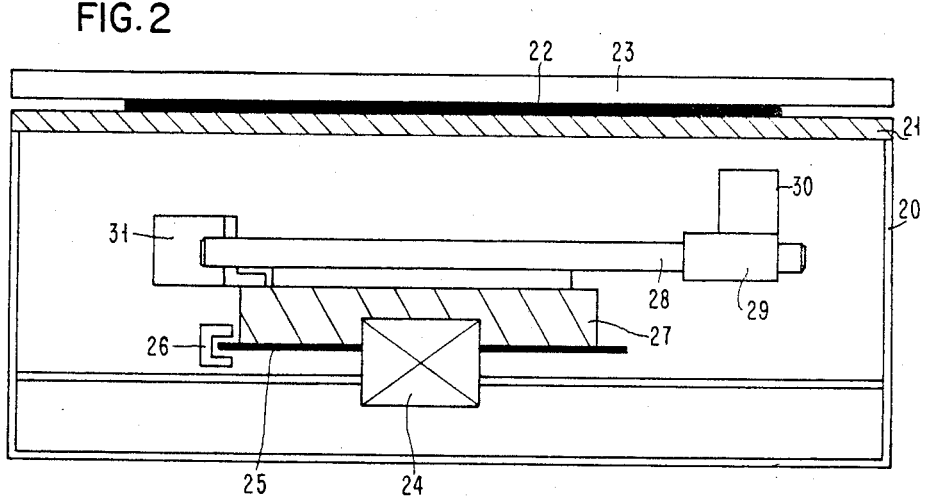
Figure 3:
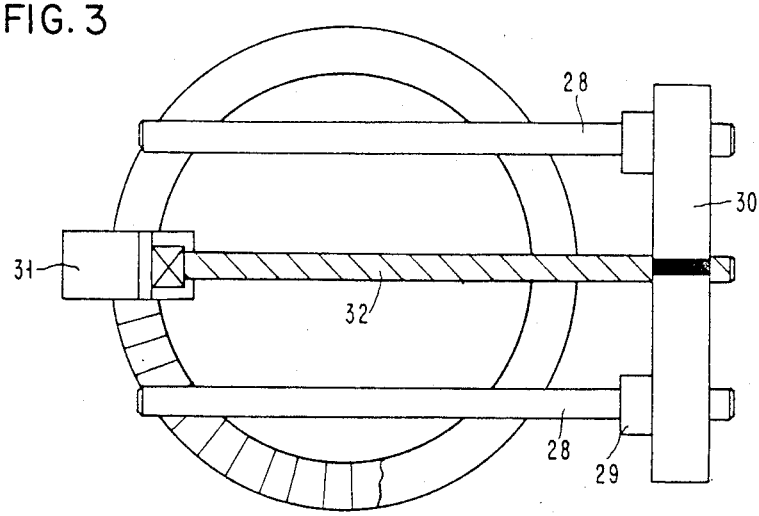
FIG. 3 is another view of the FIG. 2 scanning mechanism, and FIG. 4 an embodiment of the invention developed from FIGS. 2 and 3.

The embodiment of the invention depicted in FIGS. 2 and 3 uses a modified principle. A casing 20 carries on its surface a transparent support 21 onto which is placed a document 22 to be scanned. The entire unit is covered with a cover 23.

Casing 20 contains on a partition a driving motor 24 which can, for example, be a DC motor. This DC motor carries a position code plate 25 with positioning marks which in turn can be scanned by a position scanner 26. On this position code plate 25 a plate 27 is mounted as a first carrier. This plate 27 can be rotated with a constant speed, and it carries sliding rails 28 used as a second carrier. On these sliding rails 28 made with high precision there slides in slide bushings 29 an optical module 30 comprising for instance a photodiode arrangement, optics, an illuminating device and similar means. Optical module 30 is movable by means of a driving device consisting of a driving motor 31 and a driving spindle 32 transversally to plate 27. The scanning movement is executed in such a manner that during half a rotation of plate 27 optical module 30, in the representation of FIG. 3, moves over the plate from left to right. On principle, it would be sufficient if the module moved up to the centre of plate 27 only.

It is thus evident that both drives are independent of each other, and decoupled from each other.

Figure 4:
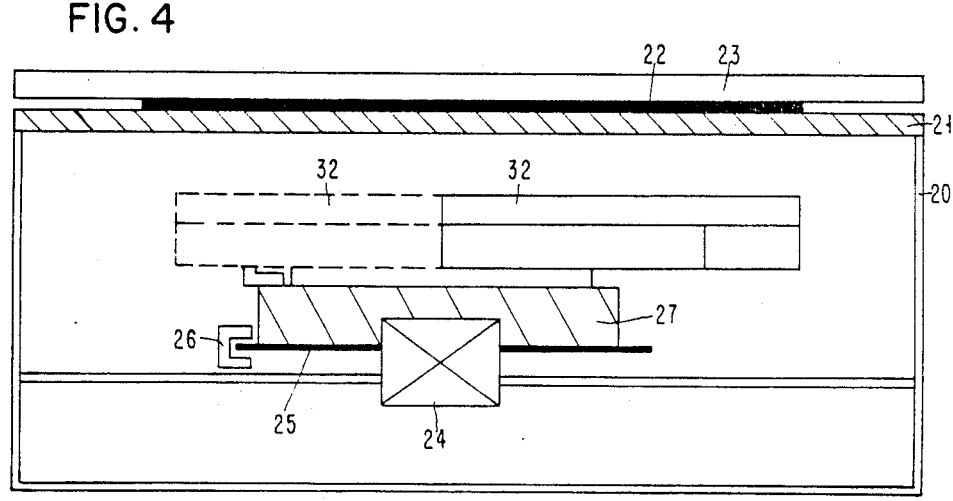

The embodiment of FIG. 4 substantially corresponds to that according to FIGS. 2 and 3, with the difference that the optical module is now affixed to plate 27, and extends over at least half the diameter of plate 27, preferably over the entire diameter. As an optical scanning module, a linear photodiode array of, for example, 4096 photodiodes is used in the present case. During one rotation of plate 27 by 180° document 22 is scanned completely. Linear photodiode arrays per se are well known, and their operation does not have to be specified here. It should be pointed out however that in the embodiment according to FIG. 4 there is only one rotation of the plate, whereas the actual scanning is only implemented via optical module 30 which absorbs the light reflected by the document, and transmits it to a processing unit. Now this device comprises only one single degree of freedom, i.e. that of the rotation of plate 27.

With this novel arrangement, an exceptionally high resolution with optimum precision can be achieved.

What is claimed is:

1. Opto-electronic image scanning apparatus comprising, a record carrier for retaining the image to be scanned, a plate,
   means for rotating said plate in a plane parallel to said record carrier, and
   a photosensitive scanning element positioned on said plate in a radial orientation relative to the axis of rotation of said plate whereby the image is scanned by said element.

2. Apparatus in accordance with claim 1 which includes means for radially moving said photosensitive scanning element on said plate.

3. Scanning apparatus as claimed in claim 1,
   characterized in that the photosensitive scanning elements comprises at least one photodiode array.

4. Scanning apparatus as claimed in claim 3,
   characterized in that the photodiode array of the photosensitive scanning element covers the full extent of the second scanning direction.

5. Scanning apparatus as claimed in claim 3, characterized in that the photosensitive scanning element comprises a light source whose beam impinges almost perpendicularly on the document support, and that the reflected radiation impinges on the photodiode arrangement.

* * * * *

UNITED STATES PATENT AND TRADEMARK OFFICE
CERTIFICATE OF CORRECTION

PATENT NO. : 4,609,818

DATED : September 2, 1986

INVENTOR(S) : Eckart Lennemann and Werner Ruppert

It is certified that error appears in the above—identified patent and that said Letters Patent is hereby corrected as shown below:

On the cover sheet of the patent, first column, in the Foreign Application Priority Data, "821111984.9" should read --82111984.9--.

Column 4, claim 3, line 24, "elements" should read --element--.

Signed and Sealed this

Eighteenth Day of August, 1987

*Attest:*

DONALD J. QUIGG

*Attesting Officer*  *Commissioner of Patents and Trademarks*